US011112771B2

(12) United States Patent
Guerrier et al.

(10) Patent No.: US 11,112,771 B2
(45) Date of Patent: Sep. 7, 2021

(54) CONVOLUTIONAL NEURAL NETWORK EVALUATION OF ADDITIVE MANUFACTURING IMAGES, AND ADDITIVE MANUFACTURING SYSTEM BASED THEREON (71) Applicant: MOOG INC., Elma, NY (US)

(72) Inventors: Paul Guerrier, Buffalo, NY (US); George Baggs, Hamburg, NY (US)

(73) Assignee: Moog Inc., Elma, NY (US)

( * ) Notice: Subject to any disclaimer, the term of this patent is extended or adjusted under 35 U.S.C. 154(b) by 0 days.

(21) Appl. No.: 16/955,334

(22) PCT Filed: Dec. 15, 2018

(86) PCT No.: PCT/US2018/065880
§ 371 (c)(1),
(2) Date: Jun. 18, 2020

(87) PCT Pub. No.: WO2019/125970
PCT Pub. Date: Jun. 27, 2019

(65) Prior Publication Data
US 2021/0089003 A1  Mar. 25, 2021

Related U.S. Application Data (60) Provisional application No. 62/608,045, filed on Dec. 20, 2017.

(51) Int. Cl.
G05B 19/4099 (2006.01)
B33Y 30/00 (2015.01)
(Continued)

(52) U.S. Cl.
CPC ........ G05B 19/4099 (2013.01); B29C 64/393 (2017.08); B33Y 30/00 (2014.12);
(Continued)

(58) Field of Classification Search
CPC ...... G05B 19/4099; G05B 2219/49023; B33Y 50/02; B33Y 30/00; G06N 20/00; B29C 64/393
See application file for complete search history.

(56) References Cited

U.S. PATENT DOCUMENTS 7,771,417 B2 * 8/2010 Telfair .................. H01S 3/109
606/5
2013/0015596 A1  1/2013 Mozeika et al.
(Continued)

FOREIGN PATENT DOCUMENTS

CN  107097407 A  8/2017
CN  107402217 A  11/2017
CN  107457996 A  12/2017

OTHER PUBLICATIONS

Chung, Junyoung, et al., Empirical Evaluation of Gated Recurrent Neural Networks on Sequence Modeling, arXiv:1412.3555v1 [cs.NE], Dec. 11, 2014.
(Continued)

Primary Examiner — Thomas C Lee
Assistant Examiner — Michael Tang
(74) Attorney, Agent, or Firm — Hodgson Russ LLP (57) ABSTRACT An additive manufacturing system uses a trained artificial intelligence module as part of a closed-loop control structure for adjusting the initial set of build parameters in-process to improve part quality. The closed-loop control structure includes a slow control loop taking into account in-process build layer images, and may include fast control loop taking into account melt pool monitoring data. The artificial intelligence module is trained using outputs from a plurality of convolutional neural networks (CNNs) tasked with evaluating build layer images captured in-process and images of finished parts captured post-process. The post process
(Continued)

images may include two-dimensional images of sectioned finished parts and three-dimensional CAT scan images of finished parts.

13 Claims, 6 Drawing Sheets

(51) Int. Cl.
    *B33Y 50/02*           (2015.01)
    *B29C 64/393*         (2017.01)
    *G06N 20/00*           (2019.01)

(52) U.S. Cl.
    CPC .............. *B33Y 50/02* (2014.12); *G06N 20/00* (2019.01); *G05B 2219/49023* (2013.01)

(56) References Cited

U.S. PATENT DOCUMENTS

| | | | |
|---|---|---|---|
| 2014/0156053 A1 | 6/2014 | Mahdavi et al. | |
| 2014/0271964 A1* | 9/2014 | Roberts, IV | B29C 64/393 425/150 |
| 2015/0045928 A1* | 2/2015 | Perez | B29C 64/112 700/110 |
| 2016/0046077 A1* | 2/2016 | Yadroitsau | B29C 64/153 264/40.1 |
| 2017/0002467 A1* | 1/2017 | Straw | C23C 16/52 |
| 2017/0144378 A1 | 5/2017 | Giera | |
| 2018/0111335 A1* | 4/2018 | Mummidi | B29C 64/20 |
| 2018/0207722 A1* | 7/2018 | Feldmann | B33Y 10/00 |
| 2018/0243977 A1* | 8/2018 | Meinders | B28B 1/001 |
| 2018/0341248 A1* | 11/2018 | Mehr | G06N 3/0454 |
| 2019/0118300 A1* | 4/2019 | Penny | B33Y 50/02 |
| 2019/0126606 A1* | 5/2019 | Fornos | B29C 64/393 |
| 2019/0184486 A1* | 6/2019 | Flamm | B23K 9/042 |

OTHER PUBLICATIONS

Kim, Minje, et al., Bitwise Neural Networks, arXiv:1601.06071v1 [cs.LG], Jan. 22, 2016.

Morgan, Jacob P., et al., Selection and Installation of High Resolution Imaging to Monitor the PBFAM Process, and Synchronization to Post-Build 3D Computed Tomography, Solid Freeform Fabrication 2017: Proceedings of the 28th Annual International Solid Freeform Fabrication Symposium, Austin, Texas, Aug. 7-9, 2017, pp. 1382-1399.

Petrich, Jan, et al., Machine Learning for Defect Detection for PBFAM Using High Resolution Layerwise Imaging coupled with Post-Build CT Scans, Solid Freeform Fabrication 2017: Proceedings of the 28th Annual International Solid Freeform Fabrication Symposium, Austin, Texas, Aug. 7-9, 2017, pp. 1363-1381.

Young, Michael D., et al., Spatial Frequency Modulated Imaging (SPIFI) with Amplitude or Phase Grating from a Spatial Light Modulator, Proceedings of the SPIE, vol. 10069, id. 100692P 8 pp., 2017.

* cited by examiner

CONVOLUTIONAL NEURAL NETWORK EVALUATION OF ADDITIVE MANUFACTURING IMAGES, AND ADDITIVE MANUFACTURING SYSTEM BASED THEREON

FIELD OF THE INVENTION

The present invention relates to the field of additive manufacturing (AM).

BACKGROUND OF THE INVENTION

AM machines are useful in building finished parts according to a layer-by-layer build process. For example, laser powder bed fusion AM machines use either a laser or an electron beam to melt and fuse powder material. Powder bed fusion processes involve spreading thin layers of powder material over previous layers using a roller or a blade, and scanning the laser or electron beam in a controlled manner over the powder layer to form the layer according to a desired geometry of the part. A geometric computer model of the part is converted to an AM build parameter file in which various control parameters of the AM machine are defined for controlling the scanning and fusion operations for each build layer.

While AM shows great promise for manufacturing parts that are difficult and/or time consuming to manufacture by traditional subtractive manufacturing, and for manufacturing parts "on demand" at remote locations where an AM machine is present, concerns about the quality of parts made by AM have slowed its widespread adoption in critical industries. For example, parts made by AM sometimes exhibit porosity, voids, and poor surface finish, thus hampering acceptance of AM for safety critical applications such as aerospace and medical applications. This places an added burden on quality control inspection of finished AM parts, especially for parts intended for safety critical applications such as medical devices and aircraft parts.

It has been suggested in various publications that artificial intelligence can be applied to AM to improve the quality of finished parts. However, the publications lack any useful details or practical description of how to apply artificial intelligence to AM to improve the quality of finished parts.

SUMMARY OF THE INVENTION

The present disclosure provides an AM system for building a part layer-by-layer in an AM machine according to an AM build process, wherein the system includes a closed-loop control structure for adjusting an initial set of build parameters in-process. As used herein, the term "in-process" refers to a time period during which the part is in the process of being built in the AM machine. The term "in-process" is distinguished from the term "post-process," which is used herein to refer to a time period after the part has been built in the AM machine.

The closed loop control structure of the present disclosure includes a slow control loop having a trained artificial intelligence module, and may further include a fast control loop having a state machine. As used herein, "slow control loop" means a control loop having a controller gain update period on the order of whole seconds, and "fast control loop" means a control loop having a controller gain update period on the order of microseconds. The trained artificial intelligence module may be a deep learning module having a recurrent artificial neural network.

In one embodiment, the AM system includes a melt-pool monitoring system arranged to acquire real-time melt pool data representative of a melt pool formed by the energy source in-process, and a build layer image sensor arranged to acquire layer images of the part layers in-process. An initial set of build parameters, a time-based sequence of adjusted build parameters corresponding to the build process, the layer images, and the melt pool data are transmitted as inputs to the trained artificial intelligence module of the slow control loop. The melt pool data may be transmitted as an input to the state machine of the fast control loop.

In accordance with the present disclosure, the trained artificial intelligence module may be trained using evaluation data from a first convolutional neural network (CNN) configured to evaluate layer images acquired in-process, and at least one second CNN configured to evaluate images of finished parts acquired post-process. For example, a CNN may be configured to evaluate two-dimensional images of sectioned finished parts acquired post-process, and another CNN may be configured to evaluate three-dimensional images of parts acquired post-process by computer tomography (CT) scanning of a finished part.

BRIEF DESCRIPTION OF THE DRAWINGS

The nature and mode of operation of the present invention will now be more fully described in the following detailed description of the invention taken with the accompanying drawing figures, in which.

DETAILED DESCRIPTION OF THE INVENTION

Figure 1:
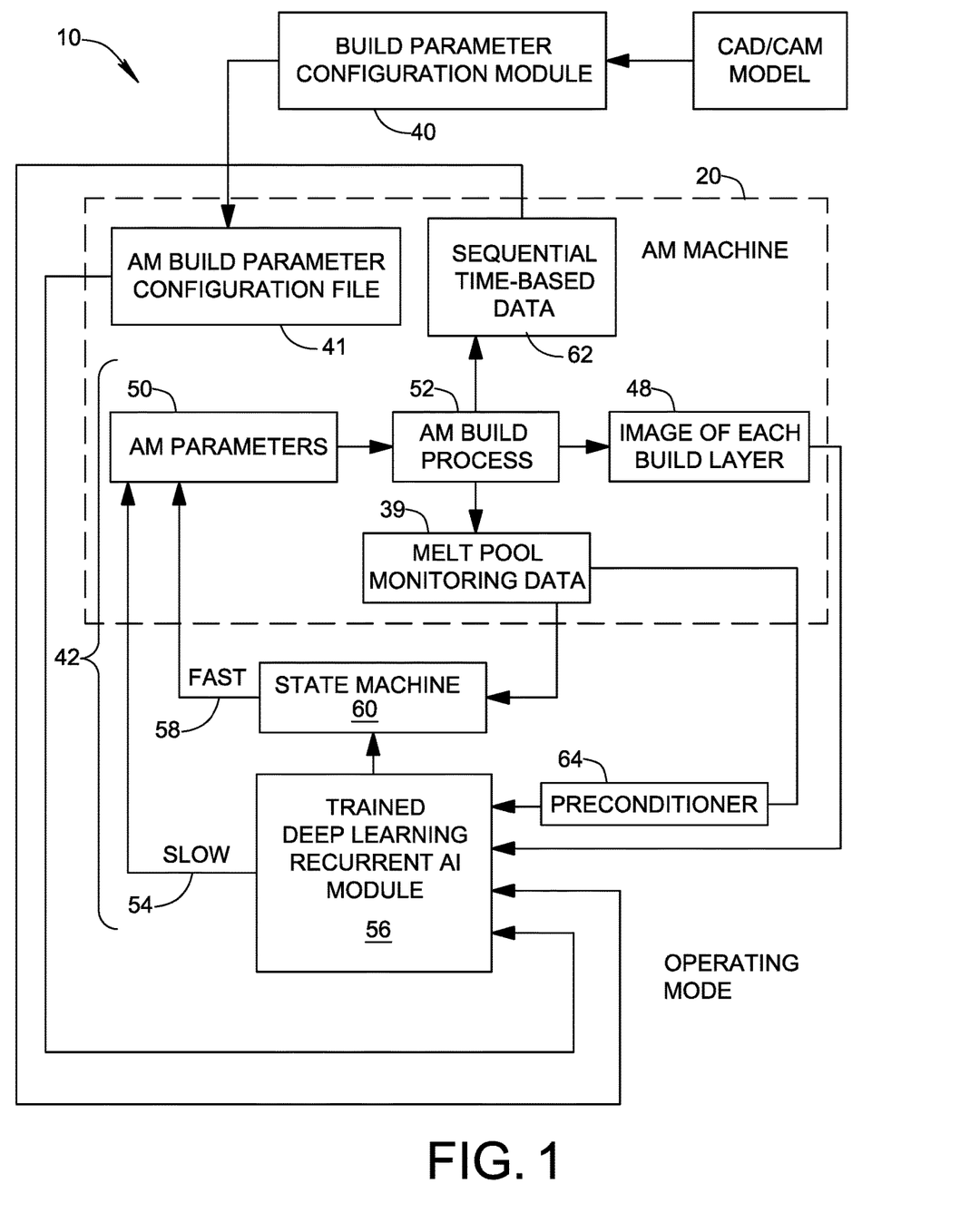
FIG. 1 is a schematic illustration of an AM system formed in accordance with an embodiment of the present invention.

An AM system 10 formed in accordance with an embodiment of the present invention is shown in FIG. 1. AM system 10 comprises an AM machine 20, shown in greater detail in FIG. 2. AM machine 20 may be in the form of a laser powder bed machine of a type including a powder reservoir 22, a powder bed 24 in which a part P is built, and a powder scraper 26 for transferring a new layer of powder from powder reservoir 22 into powder bed 24. The elevation of powder reservoir is adjusted by means of a powder delivery actuator 23 and the elevation of powder bed 24 is adjusted by means of a fabrication actuator 25. AM machine 20 further includes an energy source in the form of a laser 28, and a scanner system 30 for redirecting and scanning a beam 32 from energy source 28 over each new layer of powder in powder bed 24 in a controlled manner to form part P. As will be understood, beam 30 interacts with powder layer in powder bed 24 and forms a trailing melt pool 33 which solidifies and fuses with part P to build the part. AM machines of the type described above are available from Renishaw plc of the United Kingdom.

Figure 2:
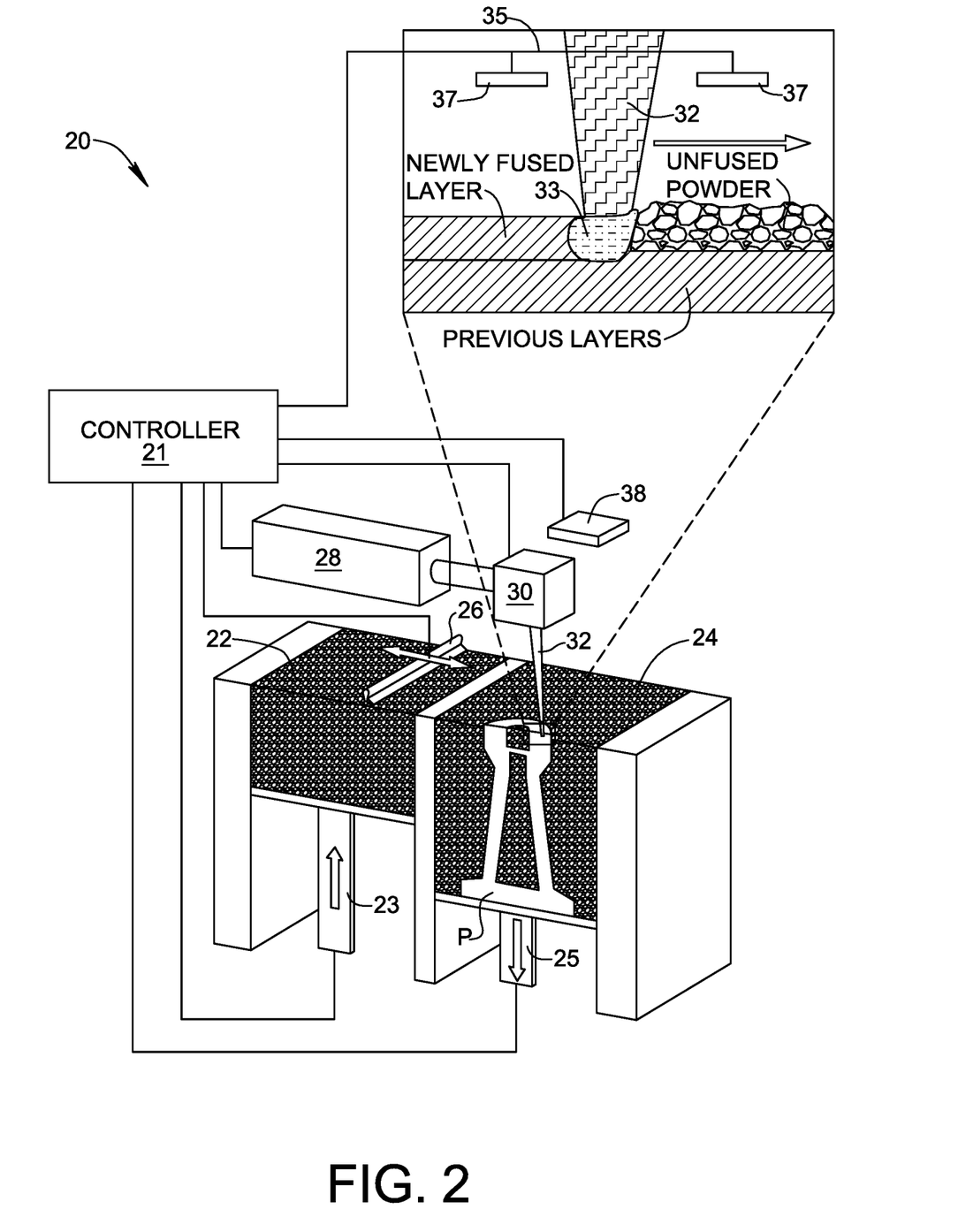
FIG. 2 is a schematic illustration of an AM machine of the AM system shown in FIG. 1.

AM machine 20 may be equipped with a melt-pool monitoring system 35 having one or more melt pool sensors 37 arranged to acquire real-time melt pool data 39 representative of melt pool 33 in-process. AM machine 20 is also equipped with a build layer image sensor 38 arranged to acquire layer images of part layers in-process. Additionally, spatial frequency modulated imaging (SPIFI) may be utilized to glean information about the state of the melt pool 33 directly through the beam 32; see, e.g., Young, Michael D., et al, Spatial Frequency Modulated Imaging (SPIFI) with amplitude or phase grating from a spatial light modulator, Proceedings of the SPIE, Vol. 10069, id. 100692P 8 pp. (2017). The various components of AM machine 20 are connected to a microprocessor-based controller 21 configured to control the build process.

AM system 10 may include a build parameter configuration module 40 programmed to generate an initial set of build parameters for building part P in the AM machine 20. The initial set of build parameters may be stored as a build parameter configuration file 41 in memory accessible by processing and control electronics of AM machine 20. The initial set of build parameters 41 may be based at least in part on a geometric model of part P inputted to the build parameter configuration module 40. By way of non-limiting example, the geometric model may be provided as one or more digital CAD/CAM files describing part P, and build parameter configuration module 40 may be a computer module programmed to read the CAD/CAM model information and generate laser control settings, scanner motion control commands, layer thickness settings, and other control parameters for operating AM machine 20 to build part P. Build parameter configuration module 40 may be part of AM machine 20, or may be separate from AM machine 20 and in communication therewith. An example of commercially available software for generating AM build parameters from CAD/CAM files is MATERIALISE® Magics™ data preparation software available from Materialise N.V. of Belgium.

Figure 3:
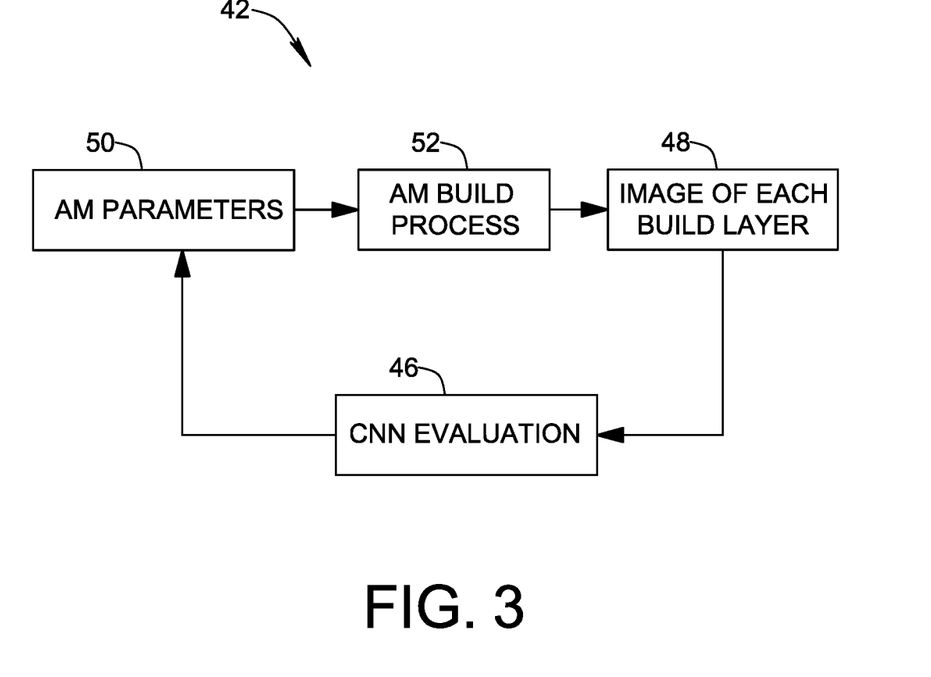
FIG. 3 is a block diagram of a basic closed loop AM control system according to an aspect of the present invention, wherein layer images are evaluated by a convolutional neural network (CNN) to provide feedback.

AM system 10 comprises a closed-loop control structure 42 for adjusting the initial set of build parameters 41 in-process. In a basic embodiment shown in FIG. 3, the closed loop control structure 42 includes a trained artificial intelligence (AI) module in the form of a CNN 46 trained and configured to evaluate layer images 48 of part P acquired in-process by build layer image sensor 38. The evaluation result provided by CNN 46, which may indicate a degree to which each captured layer image 48 corresponds to an expected or desired appearance of the layer, is used in block 50 to calculate adjusted build parameters of AM machine 20 in-process to influence building of subsequent layers as the build process continues in block 52. The evaluation result may be in the form of an assigned classification of each build layer image 48 into a predetermined category (e.g. very good, good, fair, bad, etc.).

In another embodiment corresponding to FIG. 1, closed loop control structure 42 includes a slow control loop 54 having a trained AI module in the form of a deep learning recurrent AI module 56, and a fast control loop 58 having a state machine 60.

In slow control loop 54, the initial AM build parameters 41 generated by build parameter configuration module 40 are inputted to deep learning recurrent AI module 56. Other inputs to trained AI module 56 may include sequential time-based data 62 representing AM process variables and parameters over time (e.g. argon flow, temperature, sound/vibration transducer levels, voltage, current, etc.), build layer images 48 acquired in-process by build layer image sensor 38, and melt pool data 39 acquired in-process by melt pool monitoring system 35. The melt pool data 39 may be preconditioned by a preconditioner 64 before input to deep learning recurrent AI module 56. For example, preconditioner 64 may be programmed to accumulate and average melt pool data 39 over each build layer or a set of build layers. The preconditioning may be adjustable to have a shorter or longer frame rate.

Deep learning AI module 56 may have a recurrent neural network (RNN) component combined with one or more CNNs to form a committee of neural networks. The RNN component may be implemented, for example, as long short-term memory (LSTM) to overcome the so-called "vanishing or exploding gradient problem," or a gated recurrent unit (GRU), which will allow the use of a large stack of recurrent networks that add process states and long-term memory capabilities to learn the complex, noisy and non-linear relationship between the fast in-process update data and the slow process output data, and predict the correct AM build parameters needed to build good quality parts. GRUs are described, for example, in Chung, et al, Empirical Evaluation of Gated Recurrent Neural Networks on Sequence Modeling, arXiv:1412,3555v1 [cs.NE] 11 Dec. 2014. The trained deep learning AI module 56 may be used to close the slow layer-to-layer evaluation of part quality for enhanced slow process feedback control. AI module 56 may be configured as a computer or network of computers running AI intelligence software. For example, the software may be programmed in Python™ programming language supported by the Python Software Foundation, using, as examples, TensorFlow (Google's open source artificial neural network (ANN) software library at https://www.tensorflow.org), Theano (University of Montreal's Deep Learning Group's open-source ANN software library at http://deeplearning.net/software/theano/index.html), or CNTK (Microsoft's Cognitive Toolkit at https://www.microsoft.com/en-us/cognitive-toolkit/) to actually implement the artificial neural network AI. Alternatively or additionally, more traditional programming languages such as C and C++ may be used. With regard to hardware, because AI module 56 may be running as an inference-only AI, the trained neural network could be run using fixed-point math or even lower bit-count (for example BNNs or Bitwise Neural Networks; see, e.g., Kim, Smaragdis, Bitwise Neural Networks, arXiv: 1601.06071v1 [cs.LG] 22 Jan. 2016 (https://arxiv.org/pdf/1601.06071.pdf)) on dedicated computing platforms, and this may dramatically improve the processing-throughput of the AI module.

In fast control loop 58, melt pool data 39 may be inputted to state machine 60 along with output from deep learning AI module 56. A state machine output from deep learning AI module 56 may be used as part of the fast control loop 58, which may be configured as a separate state-variable inner control loop on the fast process control gain update. For example, a state machine output from the LSTM mentioned above may be inputted to state machine 60 and used to facilitate fast-loop closure of the melt pool control.

Figure 6:
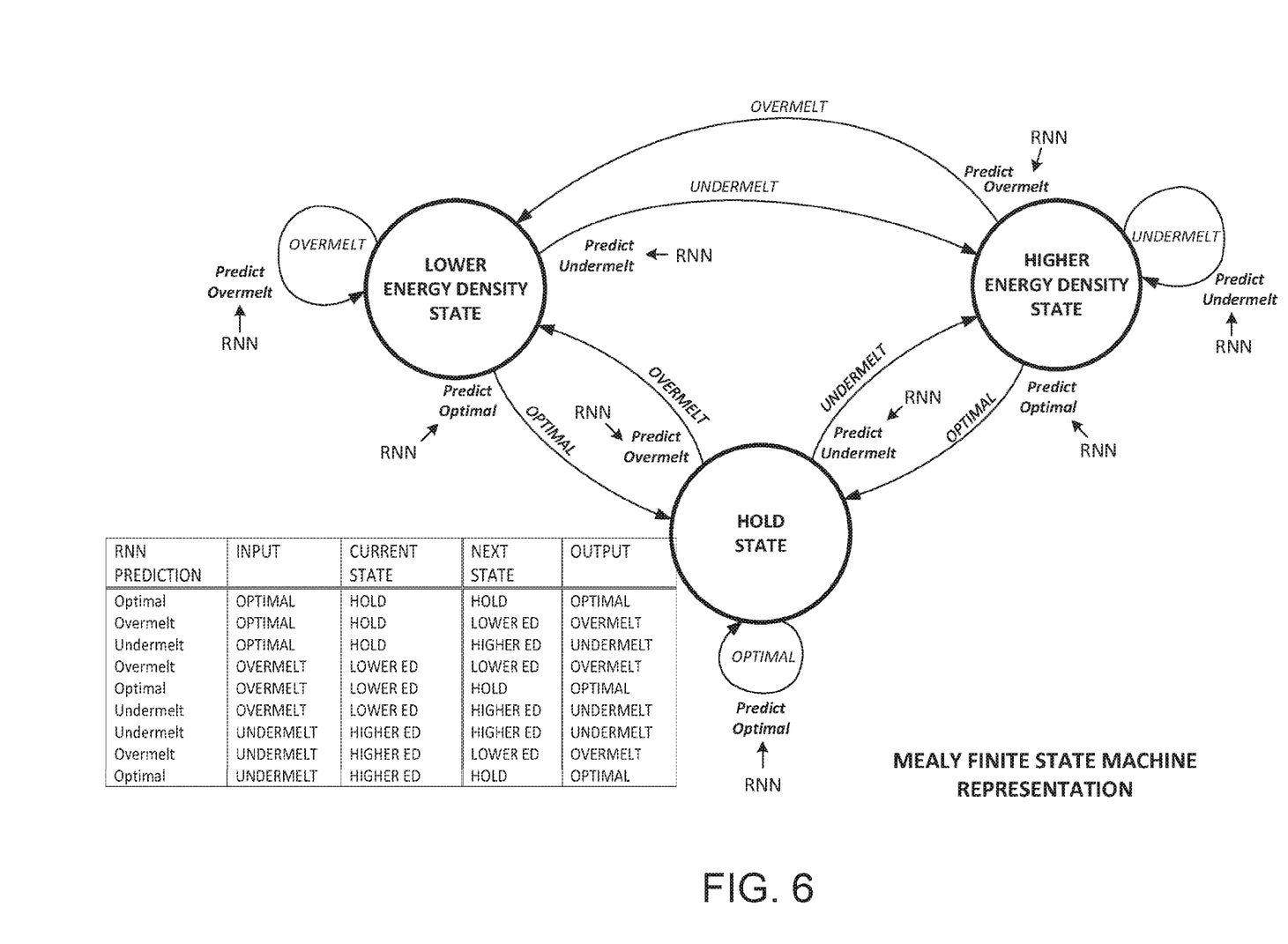
FIG. 6 is a block diagram of a simplified example representing how a recurrent neural network (RNN) can interface to a finite state machine (FSM).

In FIG. 6, a simple example of state machine 60 is shown with three different states as represented by a Mealy FSM, where the outputs from each state depend on the current state and the inputs to the FSM. The three states are "Hold" where the control scheme is maintained, "Lower Energy Density"

(Lower ED) where the control scheme favors lowering the specific energy density (ED) being input to the powder bed 24 by beam 32, and "Higher Energy Density" (Higher ED) where the control scheme favors elevating the specific ED being input to the powder bed 24 by beam 32. Also in this example, the input to the FSM is an output from trained RNN 56 that predicts the condition of the melt pool 33. The prediction is based on the FIG. 5 training imparted to RNN 56 by the FIG. 4 augmented data.

Each state in the FIG. 6 example represents a different or altered control scheme. These control schemes could be implemented as simple gain-controlled feedback loops or as complex stochastic optimal controllers. Those skilled in the art will recognize that this is merely a simplified example of how a state machine 60 for fast-loop 58 control could be interfaced with the output from a RNN 56, and that many other and more complex configurations are possible, including different control scheme states, as well as the way the control scheme states alter the many possible implementations of the underlying controllers.

As may be seen in FIG. 1, slow loop feedback from trained deep learning AI module 56 and fast loop feedback from state machine 60 may be used to calculate adjusted AM build parameters in block 50 for operating AM machine 20 in a manner which improves part quality.

Figure 4:
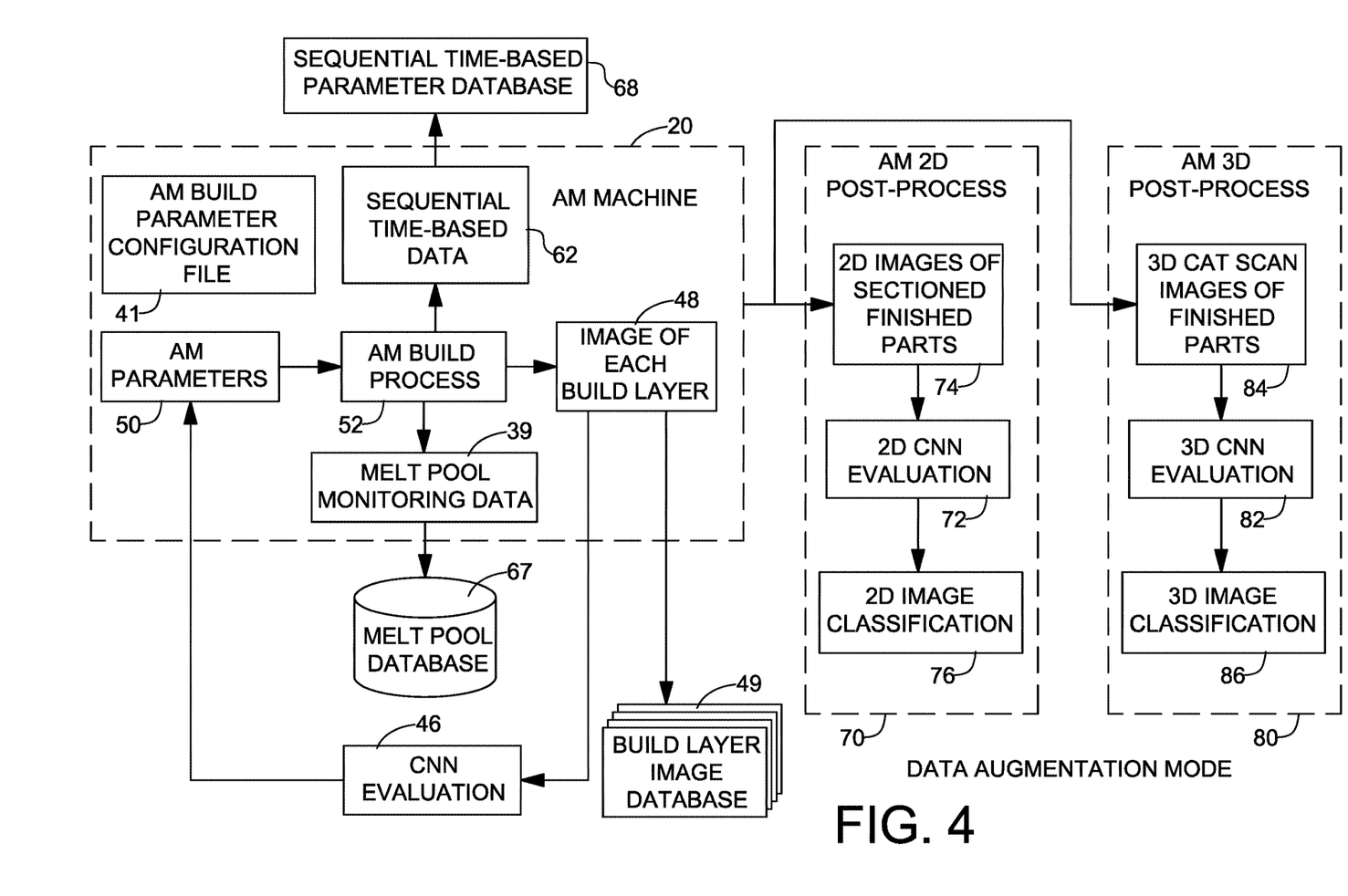
FIG. 4 is a block diagram of an augmented data collection architecture according to an aspect of the present invention, wherein post-process image data of finished parts is collected in correspondence with data collected in-process by the AM machine.

An approach to training deep learning AI module 56 in accordance with an embodiment of the invention is now described with reference to FIGS. 4 and 5. Teacher data for training deep learning AI module 56 may be collected by operating AM machine 20 to build parts in a data augmentation mode represented by FIG. 4. As may be understood, basic CNN 46 tasked with evaluating in-process build-layer images 48 may be augmented by one or more further CNNs 72 and 82 configured to evaluate images of finished parts acquired post-process as indicated by blocks 70 and 80, respectively. The actual images 48 may also be collected in a build layer image database 49.

In block 70, parts P built by AM machine 20 are sectioned post-process, for example by cutting the part and polishing an exposed sectional surface at a known layer depth, and then capturing a two-dimensional (2D) image 74 of the exposed surface using an imaging camera. The 2D images 74 captured post-process may then be evaluated and classified by CNN 72. For example, possible classifications 76 may include under-melt, just right, and over-melt. The post-process 2D image at a given layer depth may be directly related to the associated image 48 of the layer acquired in-process. This relation may be controlled by a software application programmed to synchronize the data augmentation in FIG. 4 to allow the RNN 56 to be trained on the reconstructed virtual part build from actual data. The number of virtual part builds will be limited only by how much data is available for collection.

The virtual part build aspect of the software application may allow simulations of how a trained RNN 56 will act using actual data, and may allow integrated computational materials engineering (ICME) models to be improved and/or validated. Additionally, better predictive models may be constructed using the virtual build data to implement advanced control schemes such as model predictive control (MPC) into the fast 58 loop control schemes illustrated in FIG. 6.

In block 80, parts P built by AM machine 20 are scanned post-process, for example using computer-aided tomography (CAT) equipment, to capture a three-dimensional (3D) image 84 of the entire part. The 3D images 84 captured post-process may then be evaluated and classified by CNN 82. For example, the classification 86 may indicate a degree of porosity of the finished part and/or an extent to which voids are present in the finished part.

As mentioned above, in-process build layer images 48 may be collected in build layer image database 49. Other in-process data may also be collected for use in training deep learning AI module 56. For example, the fast process melt pool data 39 acquired in-process by melt pool monitoring system 35 may be stored in a binary database 67, and the sequential time-based data 62 generated by AM machine 20 while a layer is being fabricated may be stored in a sequential time-based parameter database 68.

Figure 5:
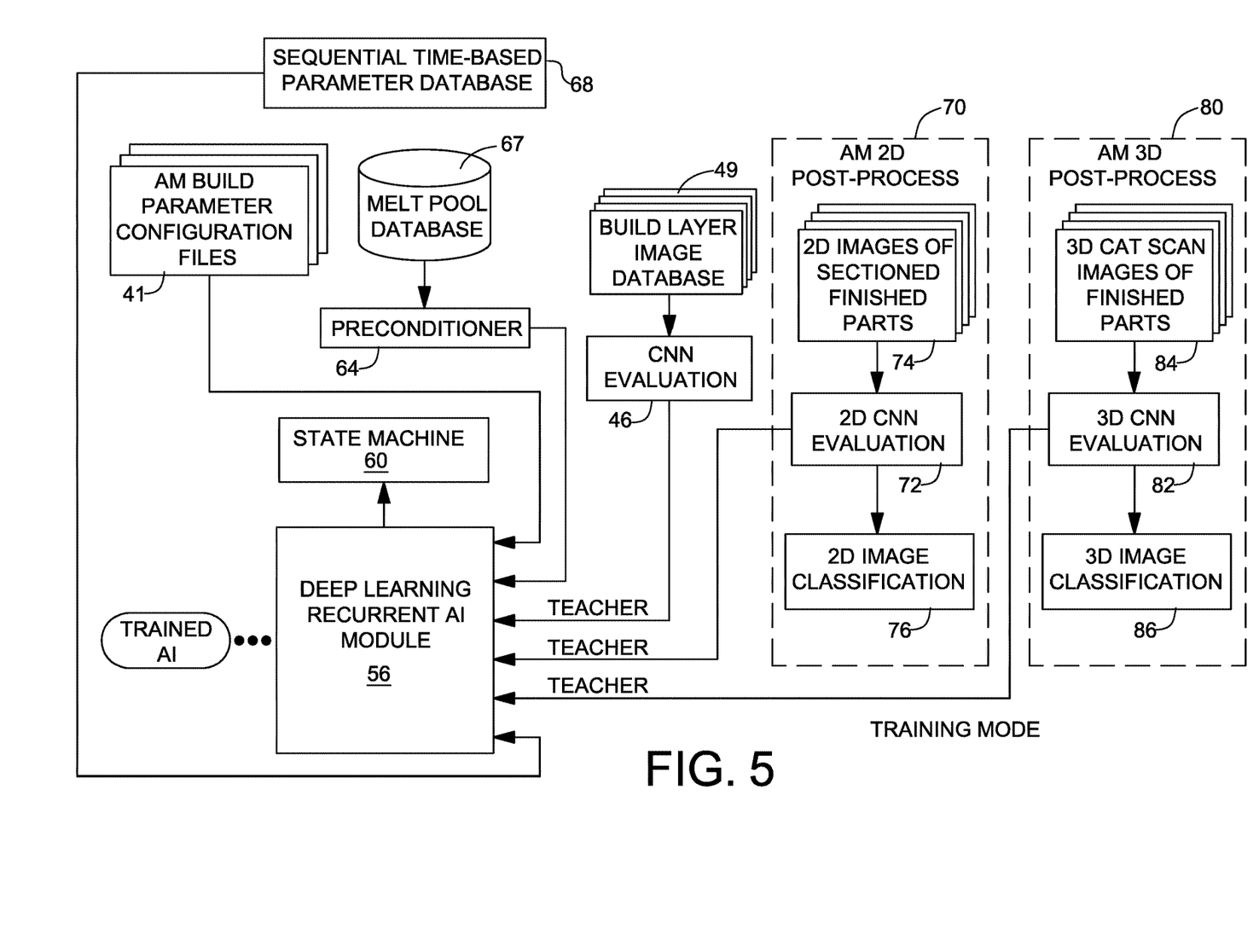
FIG. 5 is a block diagram of a training architecture useful to train an artificial intelligence module according to an aspect of the present invention.

As shown in FIG. 5, the data collected as described in connection with FIG. 4 may be used as inputs to train deep learning AI module 56. The output of CNN 46 characterizing build layer images 48 may act as one teacher input provided to deep learning AI module 56 in a training mode of operation. Similarly, outputs from CNN 72 and CNN 82 respectively characterizing post-process images 72 and 82 may act as further teacher inputs provided to deep learning AI module 56 during the training mode of operation. Fast process melt pool data 39 may be preconditioned by preconditioner 64 and inputted to deep learning AI module 56 during the training mode of operation. Sequential time-based data 62 stored in sequential time-based parameter database 68 may also be provided as an input to deep learning AI module 56 during the training mode of operation. The initial AM build parameters 41 may be provided as a further input to deep learning AI module 56 during the training mode of operation.

The various inputs to deep learning AI module 56 should be synchronized correctly to perform the training, and enough data must be available to make the training effective. An output from an LSTM component of deep learning AI module 56 may be provided to state machine 60 during the training mode of operation to later facilitate fast-loop closure of the melt pool control when AM system 10 is operated in a regular production mode. The input to state machine 60 provides a record that may allow the changing control scheme states (e.g. in FIG. 6) to be evaluated against control simulations to help evaluate the effect of the trained RNN 56 on the fast control loop 58.

Training AI module 56 using in-process and post-process information as described above will enable reliable determination of whether or not an AM part and corresponding AM process are good from several perspectives associated with good manufacturing practice. The entire set of data for the part build will be captured for the production record. First, the integrity of AM configuration data files used to manufacture a part (i.e. "data integrity") may be demonstrated and certified. Second, the integrity of the AM process used to build the part (i.e. "process integrity") may be demonstrated and certified. Third, it may be demonstrated and certified that the process performance generates good parts having high density, minimal or no porosity, and good internal grain structure (i.e. "performance integrity"). By way of analogy, the mentioned process certification for AM parts may be similar to the Design Quality (DQ), Installation Quality (IQ), Operational Quality (OQ), and Performance Quality (PQ) metrics for providing verification and validation evidence that a medical device is functioning correctly to specification. IQ, OQ and PQ are analogous to data, process and manufacturing integrity, respectively. In this case, installation of the correct AM build file is the IQ. Real-time verification that process integrity (OQ) is correct, and near real-time verification that manufacturing integrity (PQ) will come from the in-process and post-process components of the machine learning AI. The measure of goodness would be used by the machine learning AI module 56 to decide what level of goodness we actually have (through the learned recurrent memory of the non-linear relationship between the in-process measurements and the post-process measurements), and to then make automatic corrections to the process in real time such that goodness (indirectly estimated through non-linear correlation) will be maximized. DQ is equivalent to the AM design rule checks associated with a design/build file, which may integrate ICME for metals or some other physics-based design protocols.

The invention is intended to advance the manufacture of large and complex components by AM methods. This invention would result in higher quality parts made at the additive manufacturing machine and reduce the inspection burden.

While the invention has been described in connection with exemplary embodiments, the detailed description is not intended to limit the scope of the invention to the particular forms set forth. The invention is intended to cover such alternatives, modifications and equivalents of the described embodiment as may be included within the scope of the claims.

What is claimed is:

1. An additive manufacturing system for building a part layer-by-layer according to an additive manufacturing build process, the additive manufacturing system comprising:
    an additive manufacturing machine including a powder bed and an energy source, wherein a beam of energy from the energy source is scanned relative to a layer of powder in the powder bed to build each layer of the part by fusion;
    a build parameter configuration file storing an initial set of build parameters for building the part in the additive manufacturing machine, wherein the initial set of build parameters is based at least in part on a geometric model of the part;
    a closed-loop control structure for adjusting the initial set of build parameters in-process, the closed loop control structure including a slow control loop having a trained artificial intelligence module;
    a build layer image sensor arranged to acquire layer images of the part layers in-process;
    wherein the initial set of build parameters, a time-based sequence of adjusted build parameters corresponding to the build process, and the layer images are transmitted as inputs to the trained artificial intelligence module;
    wherein the trained artificial intelligence module is trained using evaluation data from a first convolutional neural network configured to evaluate layer images acquired in-process, and at least one second convolutional neural network configured to evaluate images of finished parts acquired post-process; and
    wherein the at least one second convolutional neural network includes a convolutional neural network configured to evaluate two-dimensional images of sectioned parts and another convolutional neural network configured to evaluate three-dimensional images of parts.

2. The additive manufacturing system according to claim 1, further comprising:
    a fast control loop having a state machine; and
    a melt-pool monitoring system arranged to acquire real-time melt pool data representative of a melt pool formed by the energy source in-process;
    wherein the melt pool data is transmitted as an input to the trained artificial intelligence module and as an input to the state machine.

3. The additive manufacturing system according to claim 2, wherein the melt pool data is accumulated and averaged over each build layer for a set of build layers.

4. The additive manufacturing system according to claim 1, wherein the trained artificial intelligence module is a deep learning module having a recurrent artificial neural network.

5. A method of training an artificial intelligence module for closed loop control of an additive manufacturing machine operable to perform additive manufacturing processes to build parts, the method comprising:
    collecting a set of additive manufacturing build parameter configuration files corresponding to a plurality of parts;
    collecting sequential time-based parameter data in-process by the additive manufacturing machine;
    capturing build layer images in-process;
    generating build layer image classification data by a convolutional neural network configured to evaluate the captured build layer images;
    capturing images of a built part post-process;
    generating post-process image classification data by at least one other convolutional neural network configured to evaluate the captured built part images;
    inputting to the artificial intelligence module the set of additive manufacturing build parameter configuration files;
    inputting to the artificial intelligence module the sequential time-based parameter data;
    inputting to the artificial intelligence module the build layer image classification data;
    inputting to the artificial intelligence module the post-process image classification data;
    wherein the at least one other convolutional neural network includes a convolutional neural network configured to evaluate two-dimensional images of sectioned parts and another convolutional neural network configured to evaluate three-dimensional images of parts; and
    evaluating the additive manufacturing build parameter configuration files, the sequential time-based parameter data, the build layer image classification data, and the post-process image classification data by means of the artificial intelligence module; and
    wherein the artificial intelligence module is trained to be incorporated in a closed loop control structure to adjust the initial set of build parameters in-process.

6. The method according to claim 5, further comprising:
    collecting melt pool data in-process by the additive manufacturing machine;
    inputting to the artificial intelligence module the melt pool data; and
    evaluating the melt pool data by means of the artificial intelligence module.

7. The method according to claim 5, further comprising training the artificial intelligence module with virtual part builds reconstructed from actual data.

8. An additive manufacturing system for building a part layer-by-layer according to an additive manufacturing build process, the additive manufacturing system comprising:
    an additive manufacturing machine including a powder bed and an energy source, wherein a beam of energy from the energy source is scanned relative to a layer of powder in the powder bed to build each layer of the part by fusion;
    a build parameter configuration file storing an initial set of build parameters for building the part in the additive manufacturing machine, wherein the initial set of build parameters is based at least in part on a geometric model of the part;

a closed-loop control structure for adjusting the initial set of build parameters in-process, the closed loop control structure including a slow control loop having a trained artificial intelligence module and a fast control loop having a state machine;

wherein the slow control loop has a controller gain update period on the order of whole seconds, and the fast control loop has a controller gain update period on the order of microseconds;

a build layer image sensor arranged to acquire layer images of the part layers in-process; and wherein the initial set of build parameters, a time-based sequence of adjusted build parameters corresponding to the build process, and the layer images are transmitted as inputs to the trained artificial intelligence module, and wherein melt pool data are collected in-process by the additive manufacturing machine, inputted to the artificial intelligence module, and evaluated by means of the artificial intelligence module.

9. The additive manufacturing system according to claim 8, further comprising:

a melt-pool monitoring system arranged to acquire real-time melt pool data representative of a melt pool formed by the energy source in-process; and wherein the melt pool data is transmitted as an input to the trained artificial intelligence module and as an input to the state machine.

10. The additive manufacturing system according to claim 9, wherein the melt pool data is accumulated and averaged over each build layer for a set of build layers.

11. A method of training an artificial intelligence module for closed loop control of an additive manufacturing machine operable to perform additive manufacturing processes to build parts, the method comprising:

collecting a set of additive manufacturing build parameter configuration files corresponding to a plurality of parts;

collecting sequential time-based parameter data in-process by the additive manufacturing machine;

capturing build layer images in-process;

generating build layer image classification data by a convolutional neural network configured to evaluate the captured build layer images; capturing images of a built part post-process;

generating post-process image classification data by at least one other convolutional neural network configured to evaluate the captured built part images;

inputting to the artificial intelligence module the set of additive manufacturing build parameter configuration files;

inputting to the artificial intelligence module the sequential time-based parameter data;

inputting to the artificial intelligence module the build layer image classification data;

inputting to the artificial intelligence module the post-process image classification data;

evaluating the additive manufacturing build parameter configuration files, the sequential time-based parameter data, the build layer image classification data, and the post-process image classification data by means of the artificial intelligence module;

wherein the artificial intelligence module is trained to be incorporated in a closed loop control structure to adjust the initial set of build parameters in-process, wherein the closed loop control structure includes a slow control loop having a trained artificial intelligence module and a fast control loop having a state machine; and collecting melt pool data in-process by the additive manufacturing machine;

inputting to the artificial intelligence module the melt pool data; and evaluating the melt pool data by means of the artificial intelligence module; and wherein the slow control loop has a controller gain update period on the order of whole seconds, and the fast control loop has a controller gain update period on the order of microseconds.

12. The method according to claim 11, wherein the melt pool data is accumulated and averaged over each build layer for a set of build layers.

13. The method according to claim 11, further comprising training the artificial intelligence module with virtual part builds reconstructed from actual data.

* * * * *